United States Patent
Stencel et al.

(10) Patent No.: US 8,676,368 B2
(45) Date of Patent: Mar. 18, 2014

(54) SYSTEM AND METHOD FOR OPTIMIZING A PRODUCTION PROCESS USING ELECTROMAGNETIC-BASED LOCAL POSITIONING CAPABILITIES

(75) Inventors: John Stencel, Highland, MI (US); Henry Arthur Loos, Jr., Sterling Heights, MI (US)

(73) Assignee: Fives Cinetic Inc., Farmington Hills, MI (US)

( * ) Notice: Subject to any disclaimer, the term of this patent is extended or adjusted under 35 U.S.C. 154(b) by 792 days.

(21) Appl. No.: 12/581,217

(22) Filed: Oct. 19, 2009

(65) Prior Publication Data
US 2011/0093110 A1    Apr. 21, 2011

(51) Int. Cl.
*G06F 19/00*    (2011.01)
*G06F 17/00*    (2006.01)

(52) U.S. Cl.
USPC ........... 700/108; 700/110; 700/115; 700/222; 700/117; 700/261; 382/103; 382/105; 377/17; 702/57; 702/150; 702/152; 702/182

(58) Field of Classification Search
USPC .............. 700/108, 115, 110, 32, 11; 382/103, 382/105
See application file for complete search history.

(56) References Cited

U.S. PATENT DOCUMENTS

| | | | |
|---|---|---|---|
| 6,400,139 B1 | 6/2002 | Khalfin et al. | |
| 6,845,279 B1 * | 1/2005 | Gilmore et al. | 700/115 |
| 7,055,233 B1 | 6/2006 | Hofer et al. | |
| 7,770,658 B2 * | 8/2010 | Ito et al. | 173/1 |
| 7,782,046 B2 * | 8/2010 | Anderson | 324/207.17 |
| 8,050,788 B2 * | 11/2011 | Stencel et al. | 700/117 |
| 8,515,690 B2 * | 8/2013 | Li | 702/38 |
| 2002/0038159 A1 | 3/2002 | Gass | |
| 2003/0212534 A1 * | 11/2003 | Lysaght | 702/190 |
| 2004/0182587 A1 * | 9/2004 | May et al. | 173/2 |
| 2006/0185899 A1 * | 8/2006 | Alft et al. | 175/24 |

(Continued)

FOREIGN PATENT DOCUMENTS

| | | | |
|---|---|---|---|
| DE | 19956178 A1 | 5/2001 | |
| DE | 10054095 | * 5/2002 | ............... G07C 1/10 |

(Continued)

OTHER PUBLICATIONS

Estic, "Electric Handheld Nutrunner", 2009, pp. 19.*

(Continued)

*Primary Examiner* — Kavita Padmanabhan
*Assistant Examiner* — Olvin Lopez Alvarez
(74) *Attorney, Agent, or Firm* — Quinn Law Group, PLLC

(57) ABSTRACT

A system includes a handheld tool for executing steps of a sequence within a work cell. An electromagnetic marker connected to the tool emits a magnetic field within the cell. A receptor detects the magnetic field and generates a raw position signal in response thereto. A control unit updates an assembly setting of the tool. The host executes a control action when a position determined using the raw data is not equal to an expected position in the sequence. A method calculates the present position of a torque wrench using magnetic fields generated by the marker and measured by a receptor array, and calculates a present position of the tool or a fastener. The present position of the fastener may be compared to an expected position in the calibrated sequence, and the torque wrench may be disabled when the fastener position is not equal to the expected position.

14 Claims, 3 Drawing Sheets

(56) References Cited

U.S. PATENT DOCUMENTS

| | | | |
|---|---|---|---|
| 2007/0272423 A1* | 11/2007 | Cutler et al. | 173/1 |
| 2008/0021590 A1* | 1/2008 | Vanko et al. | 700/168 |
| 2008/0196912 A1* | 8/2008 | Gass et al. | 173/4 |
| 2008/0208380 A1* | 8/2008 | Taylor | 700/108 |
| 2008/0285805 A1* | 11/2008 | Luinge et al. | 382/107 |
| 2010/0140345 A1* | 6/2010 | Sakamoto et al. | 235/376 |
| 2011/0125007 A1* | 5/2011 | Steinberg et al. | 600/424 |

FOREIGN PATENT DOCUMENTS

| | | | | |
|---|---|---|---|---|
| DE | 10054095 | A1 | 5/2002 | |
| DE | 10221032 | A1 | 11/2003 | |
| EP | 2085849 | A2 | 8/2009 | |
| JP | 2004234484 | A | 8/2004 | |
| JP | 2006293762 | * | 10/2006 | G05B 19/418 |

OTHER PUBLICATIONS

Stanley, "Inteliigent Air tools", 2007, pp. 1-12.*

Polhemus, "LIBERT LATUS manual", May 2006, pp. 137.*

PCT Search Report dated Jan. 24, 2011, for co-pending PCT/US2010/053034.

* cited by examiner

SYSTEM AND METHOD FOR OPTIMIZING A PRODUCTION PROCESS USING ELECTROMAGNETIC-BASED LOCAL POSITIONING CAPABILITIES

TECHNICAL FIELD

The present invention relates generally to the use of local positioning capabilities within a manufacturing environment, and in particular to an electromagnetic-based local positioning system and a method for optimizing a production process within a manufacturing work cell.

BACKGROUND OF THE INVENTION

Various methods and devices exist for determining the relative position of a person or an object, with accuracies varying widely depending on the particular technology that is utilized. For example, a global positioning system (GPS) receiver embedded or contained within a portable or vehicle-mounted navigation system allows a user to receive satellite-transmitted positional information. Depending on the number of GPS signal transmitting satellites positioned within line of sight of the receiver at a given moment, the positional information can vary in both relative accuracy and specificity. That is, using GPS capabilities, 2-dimensional (2D) information, i.e., the present latitude and longitude of the user, or 3D positional information, i.e., the user's latitude, longitude, and altitude, can be provided within a fair degree of accuracy, in some cases as low as approximately +/−3 meters of their true position.

By way of contrast, a local positioning system (LPS) can be used to provide more precise positional information. For example, by using an LPS device or devices in a large manufacturing facility one can identify a particular area or zone of the facility in which a pallet of supplies or inventory is located, or a loading dock on which a shipment awaits shipping or receiving. A few of the more common LPS technologies include optical detection devices, infrared systems, ultra-wide band detection, and radio frequency identification (RFID) tagging, with each technology having its own advantages and disadvantages. For example, while RFID tagging is useful for certain purposes such as securely tagging a piece of merchandise to minimize theft, such a device has a limited effective distance and accuracy. Likewise, optical systems and infrared systems can perform in a less than optimal manner when used in certain high-precision applications, due in part to the potential interference provided by the many obstructions encountered in a modern work space, e.g., metallic structures and/or proximate heat sources.

In a high-volume manufacturing assembly environment, certain steps in the assembly process can be automated to minimize cost and increase production throughput and accuracy. Assembly robots having an associated hard-wired data encoder for each axis of movement can rapidly perform traditionally labor intensive assembly steps such as fastening, welding, painting, etc. However, when a work piece is positioned in a relatively restricted or confined work space, the use of an automated assembly robot may not be efficient, or even feasible. In such cases, an operator having a handheld assembly tool can enter the confined work space to perform the required assembly steps, such as is commonly experienced in certain automotive assembly processes. The conventional global and local positioning devices and methods described above can be less than optimal in such applications, particularly when the positioning devices are used for measuring the often incremental positional changes of the assembly tool as it moves between assembly positions within the confined work space.

SUMMARY OF THE INVENTION

Accordingly, an electromagnetic-based local positioning system (ELPS) and a method are provided for using local positioning within a relatively confined work space, i.e., a work cell. The ELPS and method use electromagnetic guidance capabilities to optimize an assembly or production process, e.g., the operation of a handheld torque wrench used to install threaded fasteners into a work piece, requiring a completion of a calibrated sequence within the work cell, exemplified herein as an approximately 3 meter (3 m)×3 m work space.

In the production of an automobile in particular, physical access to a part positioned in an engine compartment, in a passenger compartment, or in other portions of the vehicle may be obstructed by the vehicle frame or body, thus preventing an efficient use of an assembly robot as described above. In such a situation, an operator manually installs fasteners or executes other steps using a handheld tool, exemplified herein as an automatic torque wrench, although the tool is not necessarily limited to this particular embodiment. Moreover, production steps are usually completed according to a particular sequence, and with potentially different settings at each of the positions in the calibrated sequence, e.g., different torque setting for the torque wrench. Because of this, operators are ordinarily trained on the correct sequence and settings for a given production process, with the operator adjusting the settings of the tool as needed, by such means as by using an automated socket input/output (I/O) tray of the type known in the art. Using conventional methods, errors by the operator as to the correct next sequence position or setting may not be detected until after the step has been completed, potentially resulting in costly rework.

Within the scope of the present invention, the ELPS includes a handheld assembly tool, such as but not limited to the exemplary handheld torque wrench noted above, which is configured to execute the production process within the work cell. An electromagnetic signal emitter or "marker" is connected to the handheld tool to provide tracked moving elements, which are adapted for emitting a calibrated magnetic field or fields within the work cell. One or more stationary detecting elements or receptors are positioned in the work cell to receive or measure the calibrated magnetic field(s), and to generate or relay a raw positional signal in response thereto. The core contains the required processing electronics, and is in communication with the host and the receptors.

This positional signal is transmitted to a processing core, which calculates a position value, i.e., X, Y and Z Cartesian coordinates, and an attitude value, i.e., yaw, pitch, and roll. A host machine continuously calculates or monitors the present position of the handheld tool within the work cell using the position and attitude values, and thus may determine the actual position of any object being installed by the tool, for example a threaded fastener.

A host machine or host is in communication with the receptor(s) via the processing core. The calculated position of the handheld tool may be compared to a corresponding programmed, required, or other expected position in a calibrated sequence. A control unit, e.g., a fastener control unit (FCU) or other control unit depending on the design of the tool, may be used to communicate with the host, the receptors, and the handheld tool, and may automatically update a performance setting of the tool as needed. The host therefore may be configured to signal the FCU to automatically update the setting, and can execute one or more control actions when the present position of the handheld tool is not equal to the expected position in the calibrated sequence.

The ELPS can signal or prompt an operator of the tool with the correct next production position in the sequence, i.e., an "expected position", via a display device configured as a graphical user interface (GUI) or another suitable display device. The marker is sufficiently miniaturized and mounted to or within the handheld tool. If the tool is configured as a torque wrench, for example, the position of the tool, and thus any fastener being installed by the tool, can be quickly determined to accuracies of within a fraction of an inch, with the distance from the tool and marker to a fastener being a known or calibrated value.

Communication between the host and the marker and tool allows an automatic verification of a correct sequence position, exemplified herein as the next fastener position or other expected position, as well as instant verification of the correct assembly settings at the expected position in the calibrated sequence. After a fastener is installed, the operator is again prompted via the GUI or other device with the correct next fastener position, with the expected position being determined by automatic reference by the host to the calibrated sequence.

The host can collect and store, either locally or in a separate database, historical assembly data in order to provide a record. Such a record can be useful for quality assurance or quality control purposes, to improve operator training, to support a warranty return or repair process, etc. The historical assembly data can be collected automatically in real time by continuously downloading the data to the host and/or an associated database, or at predetermined intervals, e.g., at a preset interval such as at the end of an assembly run of predetermined length. An appropriate control action can be executed as needed at any point in the assembly run, such as but not limited to passage or transmission of a message directly to the operator via the GUI, temporary disablement of the tool until corrective action can be taken, the selective illumination of an audio and/or visual device separate or remote from the GUI, etc.

A method for optimizing a fastener installation process within a work cell includes using an electromagnetic receptor array to sense a calibrated magnetic field emitted by an electromagnetic marker, wherein the electromagnetic marker is connected to a handheld torque wrench in the work cell. A raw position signal is generated using a receptor array. The method also includes processing the raw position signal using a processing core to thereby convert the raw position signal into position and attitude values of the electromagnetic marker, and using a host machine for monitoring a present position of the torque wrench within the work cell based on the position value and the attitude value, comparing the present position of the torque wrench to an expected position in a calibrated sequence, and executing a control action when the present position of the torque wrench is not equal to the expected position in the calibrated sequence.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
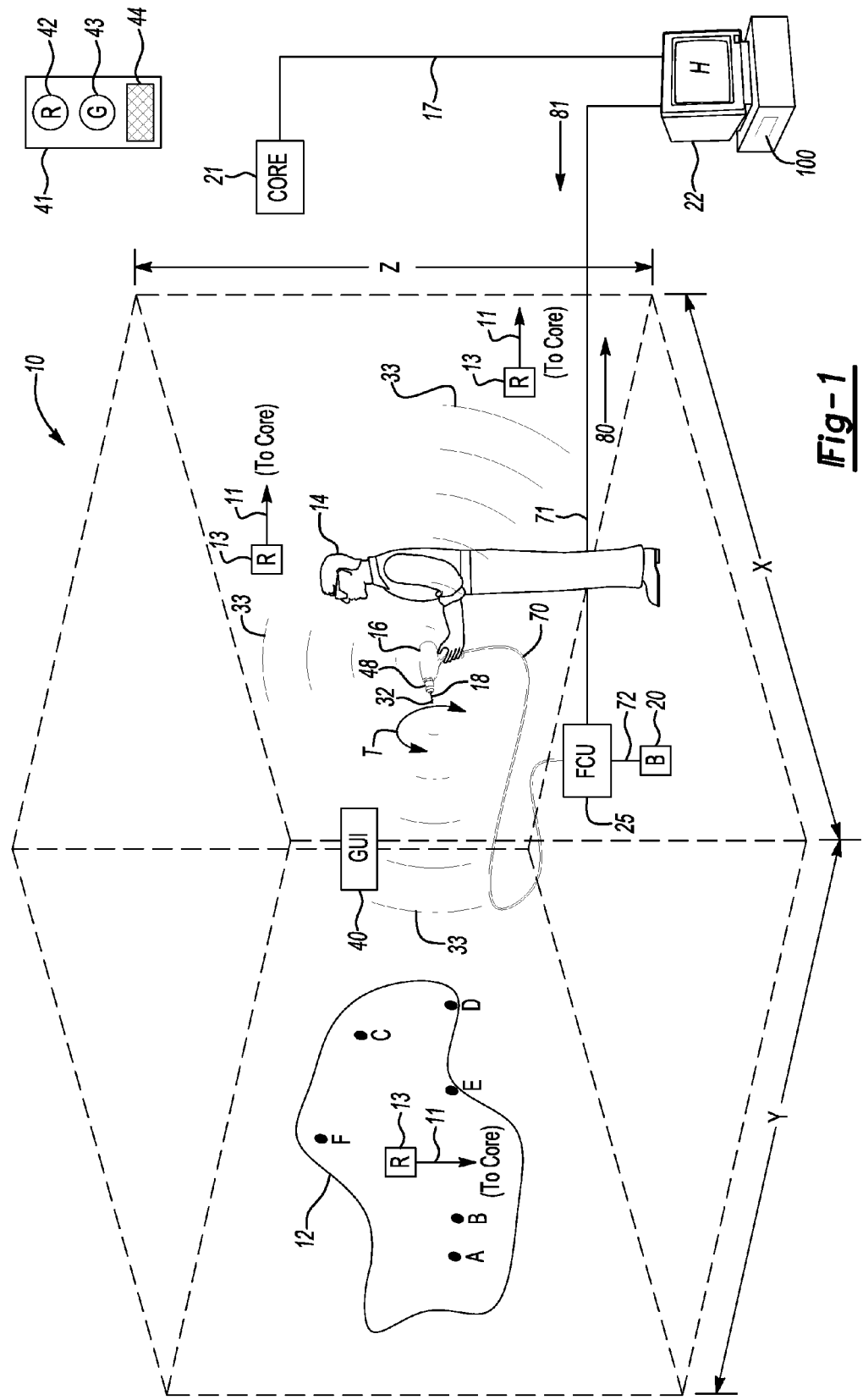
FIG. 1 is a schematic illustration of an electromagnetic local positioning system (ELPS) used in a confined work cell.

Referring to the drawings wherein like reference numbers correspond to like or similar components throughout the several figures, and beginning with FIG. 1, a relatively confined manufacturing work space or cell 10 is defined by its three primary axes, i.e., an X axis describing the depth of the cell 10, a Y axis describing its width, and a Z axis describing its height. In the exemplary embodiment of FIG. 1, the axes X, Y and Z define an approximately 3 m×3 m area representative of a relatively restricted confined assembly work space, although larger or smaller work cells 10 may also be used without departing from the intended inventive scope.

As discussed above, the production of a vehicle or another similarly complex structure may require the physical intrusion of an operator 14 into an area of the vehicle defined by the vehicle body, such as but not limited to a passenger interior, an engine compartment, or another relatively confined work space. In such a work space, screws, bolts, or other threaded fasteners, represented generally in FIG. 1 by a fastener 32, must be installed according to a calibrated sequence. Moreover, each fastener 32 can have a unique torque specification or setting, i.e., torque and angle settings as those terms are understood in the art, and therefore an error by the operator 14 as to the correct next fastener position and/or torque setting for a given position can potentially lead to assembly errors and costly rework.

Figure 2:
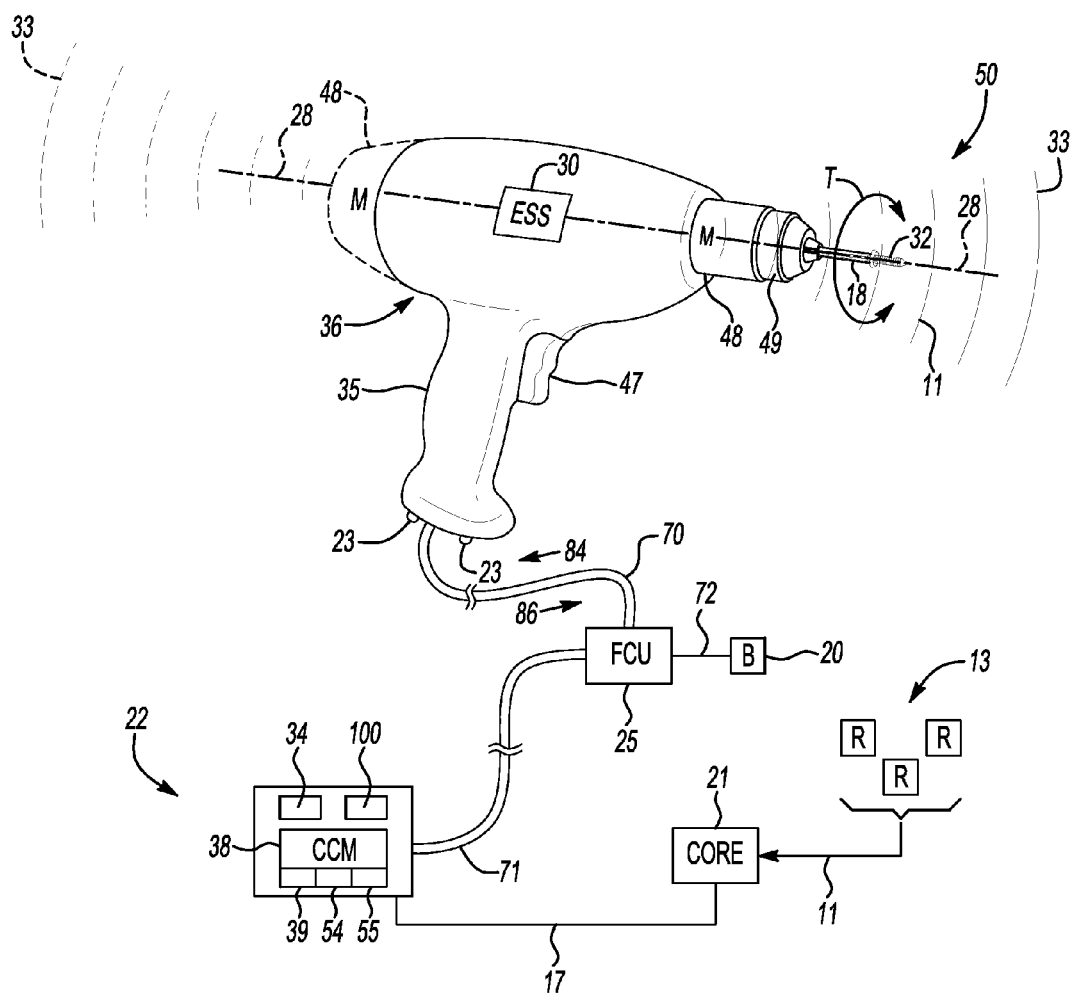
FIG. 2 is a schematic illustration of a handheld tool and a host machine of the ELPS of FIG. 1.

To work in a confined work space, an operator 14 holds a portable or handheld assembly tool 16, which in the exemplary embodiment of FIGS. 1 and 2 is configured as a portable and rechargeable electric torque wrench, although other assembly devices such as welding torches, impact drivers, rivet guns, glue guns, etc., can be used within the scope of the invention, as will be understood by those of ordinary skill in the art. When configured as a torque wrench as shown in FIG. 1, the tool 16 has a rotatable shaft 18 that is capable of delivering a predetermined torque (arrows T) to the fastener 32 when a force is exerted on a trigger 47 (see FIG. 2) by the operator 14, such as by activating an electric motor (not shown) inside of the tool.

The tool 16 is used as part of an electromagnetic local positioning system (ELPS) 50 (see FIG. 2), wherein the position of the tool is continuously monitored and tracked using magnetic field emission and detection within the cell 10. To this end, the tool 16 includes one or more electromagnetic sources or markers 48 adapted for maintaining a calibrated electromagnetic field 33 with respect to the tool, with this magnetic field or fields continuously measured via one or more receptors (R) 13 positioned within the cell 10. In one embodiment, the receptors 13 are contained in an array surrounding the tool 16.

The receptors 13 are adapted to measure the calibrated magnetic field(s) 33 from the marker(s) 48, and to generate a raw positional signal 11 in response to the calibrated magnetic fields. A processing core 21 processes the raw positional signal 11 to thereby calculate a position value, i.e., X, Y, and Z Cartesian values, and an attitude value, i.e., yaw, pitch, and roll, of the tool 16. A host 22 monitors the position of the tool 16 within the cell 10 within its XYZ inertial frame of reference during production, e.g., during installation of a fastener 32 as shown in FIG. 1 in an embodiment wherein the tool is configured as a torque wrench.

Within the cell 10, a plurality of the fasteners 32 may be installed into a work piece 12 according to a calibrated sequence, as represented by a particular order of the fastener positions A-F, respectively. For example, a fastener 32 may be installed first at position A, followed by another fastener at position B, followed by another fastener at position C, etc. The sequence A, B, C, etc., is illustrative, and may be any combination of available positions, e.g., C, B, A or B, A, C, etc., as determined by a calibrated sequence 34 (see FIG. 2) that is stored in or accessible by host 22. Also for simplicity, only six fastener positions (A-F) are shown in FIG. 1. However, it is understood that more or fewer fasteners 32 can be provided within the scope of the invention depending on the calibrated sequence 34 of FIG. 2, with each fastener having an expected position.

The host 22 includes a control algorithm 100 suitable for executing the method of the invention. The ELPS 50 includes the core 21, with the host 22 in continuous wired or wireless communication with the core over a communications pathway 17. The core 21 in turn is in continuous wireless communication with receptors 13, which in turn are in continuous wireless communication with the marker 48 and tool 16 as the tool moves within the cell 10.

The ELPS 50 may also include a fastener control unit (FCU) 25 when the tool 16 is configured as a torque wrench as shown, with the FCU connected to the tool via a cable 70. FCU 25 may be adapted to automatically update the assembly settings of the tool 16, such as by automatically downloading or updating torque and/or angle settings of the tool when the tool is configured as a torque wrench. Likewise, FCU 25 may determine the torque and angle applied to any fastener 32 during installation, and by passing this data to the host 22 for validation can minimize instances of cross threading or false torque measurements.

The FCU 25 is adapted to transmit information, data, and/or signals (arrow 80) describing the torque and angle measurements to the host 22 via another cable 71 or other suitable communications pathway to thereby enable data collection and recording by the host. The host 22 is likewise adapted to transmit information, data, or signals (arrow 81) to the FCU 25 via the cable 71 or other suitable communications pathway to enable automatic and optimized control of the tool 16. Finally, a stationary base unit 20 having calibrated coordinates, i.e., a fixed or known position, is in communication with the FCU 25 via a cable 72. The base unit 20 is configured to receive the tool 16 at the start of production, upon power cycling of the marker 48, during system failure and/or restart, etc., in order to properly recalibrate or zero the tool as described below with reference to FIG. 3, and to thereby minimize positional error.

Referring briefly to FIG. 2, the host 22 includes a communications control module (CCM) 38 that enables remote or wireless communications with the tool 16 and marker 48. The CCM 38 executes various programs or algorithms, including the algorithm 100 of FIG. 3 described below, that together control the operation of the tool 16. Accordingly, the CCM 38 may be configured as a microprocessor-based device having such common elements as a microprocessor or CPU 39, memory 54 including but not limited to: read only memory (ROM), random access memory (RAM), electrically-programmable read-only memory (EPROM), etc., and any required electronic circuitry 55, including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. However it is ultimately configured, the host 22 preferably supports most commonly-used field buses, such as but not limited to: DeviceNet, Profibus, Ethernet IP, ProfiNet, etc. so as to readily communicate with programmable logic controllers (PLC) or other devices.

The tool 16 includes an energy storage system (ESS) 30, for example a rechargeable nickel cadmium or lithium ion battery, a capacitance module, and/or another suitable energy storage device. The tool 16 can include electrical contacts or leads 23 for recharging the ESS 30 when returned to the base unit 20, and/or to signal for the transmission of information or data to the host 22 once the tool is connected or returned to the base unit 20. Recharging of the ESS 30 can be alternately provided from the FCU 25 via the cable 70 if so configured.

The ESS 30 can be used as needed for powering the sensors of the marker 48, or for powering some or all of the energy needed for operating the tool 16. When the tool 16 is configured as a torque wrench as shown in the various figures, applied torque (arrows T) can be varied automatically by automatically updating or changing the torque setting of the tool by passing torque settings (arrow 84) from the FCU 25 via the cable 70, as determined by the host 22 according to the calibrated sequence 34. Signals (arrow 86) from the tool 16 are transmitted to the FCU 25 to describe, for example, current torque settings or other configuration data of the tool.

Referring again to FIG. 1, the host 22 automatically prompts the operator 14 with a correct first bolt position from the calibrated sequence 34 of FIG. 2, and then verifies and/or updates the torque settings used by the tool 16 at that particular position. The prompt to the operator 14 is provided via a display device, such as a touch-screen graphical user interface or GUI 40 positioned within the cell 10 or in close proximity thereto, such that the GUI remains readily viewed by the operator as assembly progresses in the cell 10.

The position of the tool 16 and the marker 48 connected thereto is zeroed or recalibrated using the calibrated or known fixed position of the base unit 20 before production commences, upon marker cycle power, upon failure/restart, etc., in order to minimize any positional error. After each step, the operator 14 is again prompted with correct next fastener position in the calibrated sequence 34 of FIG. 2, while any associated torque and angle data is automatically collected by the FCU 25 and relayed to the host 22 for historical data collection, either in real time or at predetermined intervals, such as at the end of a run or sequence when the tool 16 is returned to the base unit 20.

Within the scope of the invention, the tool 16, the host 22, the algorithm 100, the FCU 25, the core 21, the receptor(s) 13, the marker(s) 48, and the base unit 20 are the integral components of the ELPS 50. Using the ELPS 50, the current position of the tool 16, and therefore each of the fasteners 32 being installed using the tool, are precisely determined within the cell 10 and validated against values provided by the calibrated sequence 34 (see FIG. 2). One or more control actions can be taken at any point in the assembly process, such as but not limited to: temporarily disabling the tool 16 until the expected position or calibrated torque and angle settings for a corresponding position in the calibrated sequence 34 is verified by the host 22, displaying a message to the operator 14 on the GUI 40, temporarily disabling the tool until the correct corresponding position is achieved, activating an optional external audio/visual alarm device 41 which can be external to the cell 10, or any other desired control action.

In the exemplary embodiment of FIG. 1, the optional external audio/visual device 41 can include a suitable visual indicator, e.g., a red lamp (R) 42 and a green lamp (G) 43, and/or an audio speaker 44 in order to simplify or customize the feedback message communicated to the operator 14 and/or to another person situated outside of the cell 10, for example a production supervisor, remote quality control monitoring station, etc. In such an embodiment, the illumination of the red lamp 42 can indicate a fault condition or error, illumination of the green lamp 43 can indicate proper conformance of the positioning and torque settings to any calibrated settings for each, and the audio speaker 44 can be used to emit a tone or alarm in the event the positioning and/or torque settings do not conform to calibrated specifications, etc.

The ELPS 50 is adapted to collect the positional data which is used to ultimately identify the X, Y and Z coordinates of a single object, in this case the marker 48 positioned in or on the tool 16, within the cell 10. The distance from the marker 48 to the fastener 32 is known, as the head of a fastener being installed is always the same distance from the marker aboard the tool. Thus, the host 22 can calculate a present position of the fastener 32 based on the calculated position of the marker 48.

The present position of the fastener 32 can be resolved down to a fraction of an inch within the cell 10 using a plurality of calibrated electromagnetic fields via the marker 48. A single point of interest within the space defined by the cell 10 can be identified within one second of resolution so that when tightening of a fastener 32 is completed, its associated coordinate information is instantly made available to the host 22 to allow the association of the torque information to a predetermined fastener position in the calibrated sequence. In other words, the marker 48 is configured to capture or collect the raw positional signal 11 in order to fully describe the roll, pitch, and yaw, collectively referred to as the attitude, of an object, e.g., the fastener 32, with respect to the X, Y and Z axes, respectively, within the XYZ inertial frame of reference in cell 10.

Referring again to FIG. 2, the ELPS 50 is shown in more detail, with the tool 16 in communication with the host 22. The tool 16 includes the marker 48 described above. The marker 48 may be configured as a miniaturized electromagnetic source module that does not overly burden or encumber the tool 16. In communication with the marker 48, receptors 13 measure the strength, orientation, and other characteristics of the calibrated electromagnetic fields maintained by the marker. Markers 48 and receptors 13 capable of electromagnetically emitting and receiving the position data usable within the ELPS 50 are commercially available from various sources. For example, see the "Liberty Latus" offered by Polhemus of Colchester, Vt.

The marker 48 may be positioned on or about an axis of rotation 28 of the shaft 18 of the tool 16, e.g., on or adjacent to a rotatable drive portion 49 in close proximity to the shaft. For example, the marker 48 can be provided with a circular cross section and placed immediately adjacent to the shaft 18, or can be annular or ring-shaped such that the marker circumscribes the shaft, thus allowing the shaft to rotate freely radially-inward of the marker while the marker remains fixed to the tool 16.

Alternately, the marker 48 can be mounted to the butt-end 36 of the tool 16 above a grip portion 35 as shown in phantom in FIG. 2, with the center of the marker still preferably positioned on the axis of rotation 28 to improve overall accuracy of the calculations. In either case, the distance from the marker 48 to the fastener 32 is known, and therefore the algorithm 100 can readily calculate the position of the fastener relative to the position of the marker. Therefore, the present position of the fastener 32 can be compared to a corresponding position in the calibrated sequence 34, while the present torque settings at that position can be updated as needed to comply with any torque settings in the calibrated sequence or referenced thereby.

That is, one or more receptors 13 continuously measure the calibrated electromagnetic fields maintained and/or emitted by the marker 48 of FIGS. 1 and 2 to precisely describe the motion of the marker and tool with respect to the X, Y and Z axes. The distance is known to the fastener 32 at the end of the shaft 18 of FIG. 2, and therefore the host 22 can use this value to continuously calculate the present position of the tool 16 in relation to the fastener using this data. That is, the host 22 can ultimately use the raw positional signal 11 to determine the roll or rotation of a given fastener 32 about the X-axis (see FIG. 1), the pitch or rotation of the tool 16 about the X-axis, the pitch or rotation of the tool about the Y-axis, and the yaw or rotation of the tool 16 about the Z-axis and establish the X, Y and Z coordinates within the inertial frame of reference in the cell 10. In this manner, the position of the tool is precisely determined.

Referring again to FIG. 1, the GUI 40 may be configured to allow alphanumeric prompts to be transmitted to the operator 14. The raw positional signal 11 from the receptor 13, as relayed to the core 21, is processed by the core to determine a position and attitude value of the tool 16. These are transmitted to the host 22, which monitors the position of the tool 16 in the cell 10, and the next fastener position A-F is displayed on the GUI 40. The current fastener positions can be associated with correct or calibrated torque settings stored in the host 22. These settings can be directly downloaded to the tool 16 via the FCU 25 for automatic adjustment of the tool 16 without the assistance of a conventional socket tray I/O.

User-friendly symbols such as a floating icon can be displayed on the GUI 40 over a template of the work piece 12 so that the operator 14 is continuously apprised of the assembly progress and past history, if so desired. For example, a template of the work piece 12 can be displayed on the GUI 40, and a circle or other suitable icon can move toward the correct next position in the calibrated sequence 34 (see FIG. 2) to guide or prompt the operator 14, and/or text can be displayed to the same end.

Using the various components of the ELPS 50 shown in FIGS. 1 and 2, the algorithm 100 determines each of the Cartesian coordinates XYZ and the Euler angles or attitude, i.e., yaw, pitch, and roll, within the inertial reference frame XYZ. The algorithm 100 integrates the position and attitude of the tool 16, and by using the original orientation of the marker 48 and tool 16 in the inertial reference frame XYZ as an initial condition, and continuously monitoring the attitude of tool as provided by the marker 48, the current orientation of the marker and tool can be continuously updated. In other words, for each of the six degrees of freedom, i.e., X, Y, Z, yaw, pitch, and roll, the algorithm 100 continuously calculates and updates the current position and orientation of the marker 48 and tool 16 within the work cell 10.

Figure 3:
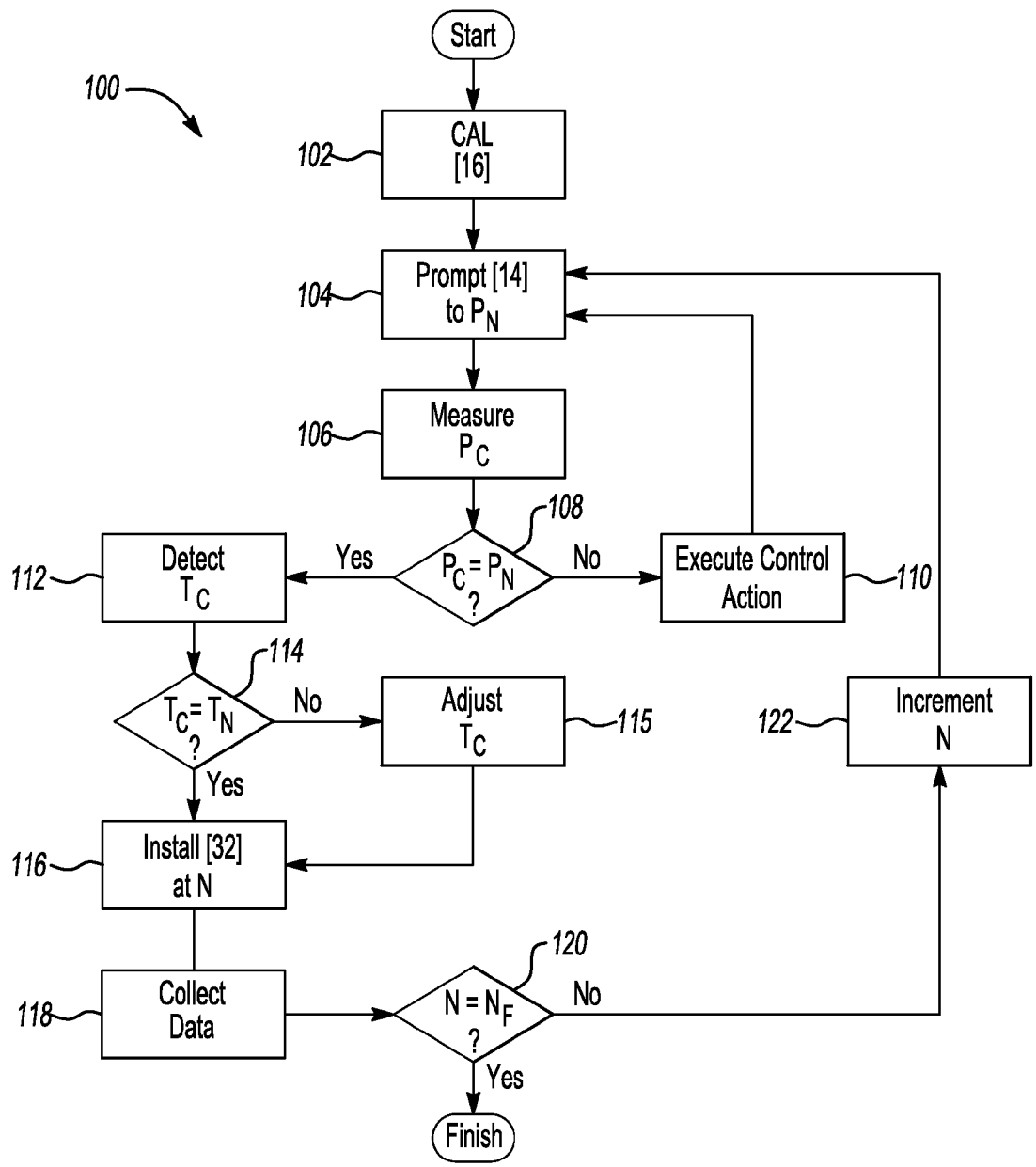
FIG. 3 is a flow chart describing a control algorithm or method for using the ELPS of FIG. 1.

Referring to FIG. 3, with reference to the various components of the ELPS 50 of FIG. 2, a flow chart describes the method 100 in more detail. As noted above, the method 100 can be embodied by a computer-executed algorithm that is executed via the host 22. Any data collected by or at the tool 16 and/or resident within the host 22, including any data contained in the calibrated sequence 34 is readily accessible and usable by the method 100, or more particularly by an algorithmic embodiment of the method.

Beginning with step 102, the tool 16 is calibrated or zeroed at the start of a new production using the calibrated, fixed, or otherwise known position or coordinates of the base unit 20. As is typical with electromagnetic control methods, integration drift can occur within data provided by the marker 48 under the influence of various metallic presences. That is, errors in measurement of the position and attitude of the marker 48 and tool 16 can be induced by un-calibrated metallic presences.

Therefore, before the start of a production run, the initial position of the tool 16 is calibrated or zeroed at step 102. In this manner, the error can be minimized and made predictable. In step 102, a pointer value "N" corresponding to the expected or anticipated first position of the first fastener can be initialized or set, such as by setting N=A in the exemplary A-F embodiment of FIG. 1. The method 100 then proceeds to step 104.

At step 104, the operator 14 is prompted via the GUI 40 to the anticipated or corresponding position ($P_N$) within the cell 10, with the value of N corresponding to the correct fastener position within the calibrated sequence 34. As it is expected that the correct positions of each fastener 32 in the calibrated sequence 34 have been previously collected and recorded to properly train the algorithm 100, the algorithm 100 instantly knows whether the present position of the operator 14 is the correct or corresponding position ($P_N$). After prompting the operator 14 by means such as but not limited to displaying of a text message or other suitable symbol on the GUI 40, the algorithm 100 proceeds to step 106.

At step 106, the current position ($P_C$) of the tool 16 is electromagnetically measured, detected, calculated, or otherwise determined using the ELPS 50 described above. That is, the electromagnetic field 33, e.g., a magnetic field, emitted by the marker 48 is collected by the receptors 13, and transformed into a raw positional signal 11 to determine positional data describing the motion of the marker 48 and tool 16 within the XYZ reference frame. The present position of the fastener 32 located a known distance away from the marker 48 may be calculated by the host 22 using the raw positional signal 11 from the receptors 13 to determine the current position ($P_C$) as described above. The algorithm 100 then proceeds to step 108.

At step 108, the current position ($P_C$) is compared to the correct or corresponding position ($P_N$). If the values of $P_C$ and $P_N$ are not equal, the algorithm 100 proceeds to step 110. Otherwise, the algorithm 100 proceeds to step 112.

At step 110, a predetermined control action or actions can be selectively executed by the host 22. The control action can include any number of desired responses, such as but not limited to: temporarily disabling the tool 16 until the operator 14 moves to the correct position, displaying a warning message on the GUI 40 or other device, temporarily shutting down the process until corrective action can be taken, illuminating the external A/V device 41, etc. The algorithm 100 then repeats step 104.

At step 112, having determined at step 108 that the operator 14 is at the proper fastener position, i.e., $P_C=P_N$, the algorithm 100 measures, detects, or otherwise determines the current torque setting $T_C$ of the tool 16. Once the current torque setting ($T_C$) is determined, the method 100 proceeds to step 114.

At step 114, the current torque setting ($T_C$) of step 112 is compared to a calibrated torque setting $T_N$ with reference to the calibrated sequence 34 or a set of torque settings associated therewith. If $T_C=T_N$, the algorithm 100 proceeds to step 116. Otherwise, the algorithm 100 proceeds to step 115.

At step 115, the current torque settings ($T_C$) are automatically adjusted. The FCU 25 can be signaled to automatically adjust, update, or download the required torque settings to the tool 16 via the cable 70, as discussed above. The algorithm 100 then proceeds to step 116.

At step 116, the installation of the fastener 32 is completed using the now-validated torque setting $T_C$ at the current position $P_C$, with current position $P_C$ having been previously validated at step 108 as described above. The algorithm 100 then proceeds to step 118.

At step 118, the ELPS 50 collects process data in an automatic mode, such that the process data is continuously collected and downloaded to the host 22 as it is collected, or as the values of the data changes. Process data as used herein refers to any data, measurements, or other information describing the installation at step 116, which can be used for various purposes, such as but not limited to quality assurance or quality control purposes, to improve operator training, to support a warranty return or repair process, etc. Alternately, the algorithm 100 can include periodically collecting such process data, for example by temporarily storing the data within the tool 16 and periodically transmitting or downloading the data to the host 22 at predetermined intervals, or when the tool 16 is returned to the base unit 20. The algorithm 100 then proceeds to step 120.

At step 120, the calibrated sequence 34 is once again referenced to see if the most recently completed fastener installation N corresponds to the last or final step of the sequence 34, i.e., $N_F$. If so, the tool 16 is returned to its base unit 20, where it is rendered idle until the next cycle begins. The method 100 is then finished. Otherwise, the method 100 proceeds to step 122.

At step 122, the value of N is incremented, with N corresponding to the corresponding position per the calibrated sequence 34. For example, if the correct or corresponding position is B in FIG. 1, the host 22 is automatically updated so that it expects or anticipates a move by the operator 14 to position B. The method 100 then repeats step 108 as set forth above.

Accordingly, by using the apparatus and method of the invention as set forth above the position of a fastening tool is located, validated, and error-proofed as an operator is automatically prompted to the correct position. Data collection associated with the apparatus and method can be initiated via a touch-screen device such as the GUI 40 of FIG. 1 to determine the number and position of any installed fasteners, as well as associated torque and angle data, all of which can be displayed on the GUI 40 or another device to provide instant feedback. End run data can be automatically collected and stored for future reference, such as by identifying particular installation steps, batches, and/or individual operators that routinely coincide with a higher than expected error rate. In this manner, quality assurance can be optimized, and/or targeted training can be enabled, each ensuring optimal process efficiency.

While the best modes for carrying out the invention have been described in detail, those familiar with the art to which this invention relates will recognize various alternative designs and embodiments for practicing the invention within the scope of the appended claims.

The invention claimed is:

1. A system for optimizing a process within a work cell, wherein the process has a calibrated sequence, the system comprising:
   a handheld tool configured to execute steps of the calibrated sequence with respect to a work piece;
   an electromagnetic marker connected to the handheld tool, wherein the electromagnetic marker is configured to emit a calibrated magnetic field within the work cell;
   a stationary electromagnetic receptor positioned in the work cell external to the handheld tool and adapted to measure the emitted calibrated magnetic field, and to generate a raw positional signal in response thereto;
a processing core in communication with the stationary electromagnetic receptor, the processing core being adapted for processing the raw positional signal to thereby calculate each of a position value and an attitude value in the form of yaw, pitch, and roll for the handheld tool;
a control unit that selectively updates a performance setting of the handheld tool;
a graphical user interface (GUI); and
a host machine in communication with the GUI, the control unit, and the processing core, wherein the host machine is operable for:
 displaying, via the GUI, an expected position from the calibrated sequence;
 continuously monitoring a present position of the handheld tool within the work cell using the position value and the attitude value;
 comparing the present position of the handheld tool to the displayed expected position in the calibrated sequence;
 comparing a current performance setting of the handheld tool to an expected performance setting corresponding to the displayed expected position; and
 executing a control action, including temporarily disabling the handheld tool, when the present position of the handheld tool is not equal to the displayed expected position in the calibrated sequence, and updating the performance setting of the handheld tool via the control unit when the current performance setting is not equal to the expected performance setting.

2. The system of claim 1, wherein the calibrated magnetic field is used by the processing core to determine a location of each of the electromagnetic marker and the handheld tool along a respective X-axis, Y-axis, and Z-axis of the handheld tool.

3. The system of claim 1, wherein the handheld tool includes a rotatable shaft portion having a longitudinal axis, and wherein the electromagnetic marker has a circular cross section and is positioned adjacent to the rotatable shaft portion such that electromagnetic marker circumscribes the shaft and the longitudinal axis.

4. The system of claim 1, wherein the control action also includes activating an audio/visual device, including activating at least one of a lamp and a speaker.

5. The system of claim 1, wherein the host machine is operable for displaying a template of the work piece via the GUI, and for overlaying the template with an icon of the expected position.

6. A system for optimizing a fastener installation process within a work cell, the system comprising:
a handheld torque wrench adapted to install a threaded fastener into a work piece, the handheld torque wrench having a rotatable shaft that rotates about an axis of rotation;
an electromagnetic marker connected to the handheld torque wrench such that the axis of rotation passes through the electromagnetic marker, wherein the electromagnetic marker is adapted to emit calibrated magnetic fields in close proximity to the handheld torque wrench within the work cell;
a stationary array of electromagnetic receptors positioned in the work cell external to the handheld torque wrench and adapted to measure the emitted magnetic fields, and to generate a raw positional signal in response thereto;
a processing core in communication with the array of receptors, wherein the processing core is adapted for processing the positional signal to thereby calculate a position value and an attitude value in the form of yaw, pitch, and roll for the electromagnetic marker;
a fastener control unit (FCU) that selectively updates a performance setting of the handheld torque wrench;
a graphical user interface (GUI); and
a host machine in communication with the processing core, the FCU, the GUI, and the electromagnetic marker, wherein the host machine is operable for:
 displaying, via the GUI, an expected position from a calibrated sequence;
 continuously monitoring a present position of the handheld torque wrench using the position value and the attitude value;
 calculating a present position of the threaded fastener using the present position of the handheld torque wrench;
 comparing the present position of the threaded fastener to the displayed expected fastener position in a calibrated fastener sequence; and
 executing at least one control action, including temporarily disabling the handheld torque wrench, when the present position of the threaded fastener is not equal to the expected fastener position, and updating the performance setting of the handheld torque wrench via the FCU when a current performance setting of the handheld torque wrench is not equal to an expected performance setting of the handheld torque wrench.

7. The system of claim 6, wherein the at least one control action further includes displaying a message to an operator of said torque wrench and activating an audible alarm.

8. The system of claim 6, wherein the electromagnetic marker has a circular cross section and is positioned adjacent to the rotatable shaft.

9. The system of claim 8, wherein the handheld torque wrench includes a butt-end and a grip portion, and wherein the electromagnetic marker is mounted to the butt-end adjacent to the grip portion such that the electromagnetic marker circumscribes the axis of rotation.

10. The system of claim 6, wherein the host machine is operable for displaying a template of the work piece via the GUI, and for overlaying the template with an icon of the expected position.

11. A method for optimizing a fastener installation process within a work cell, the method comprising:
emitting a calibrated magnetic field via an electromagnetic marker positioned within the work cell;
sensing the calibrated magnetic field via an electromagnetic receptor array, wherein one of the electromagnetic marker and the electromagnetic receptor array is connected to a handheld torque wrench;
generating a raw positional signal using the receptor array;
processing the raw positional signal using a processing core to thereby convert the raw position signal into a position value and an attitude value of the electromagnetic marker in the form of yaw, pitch, and roll; and
 continuously monitoring a present position of the handheld torque wrench within the work cell, via a host machine, based on the position value and the attitude value;
 comparing the present position of the handheld torque wrench to an expected position in a calibrated sequence;
 displaying, via a graphical user interface (GUI), an expected position from a calibrated sequence;

comparing a current performance setting of the handheld torque wrench to an expected performance setting from the calibrated sequence; and executing a control action, including temporarily disabling the handheld torque wrench, when the present position of the handheld torque wrench is not equal to the expected position in the calibrated sequence, and updating the performance setting of the handheld torque wrench via a fastener control unit when the current performance setting is not equal to the expected performance setting.

12. The method of claim 11, wherein executing a control action further includes:

detecting a present torque setting of the handheld torque wrench as the current performance setting;

comparing the present torque setting to a calibrated torque setting, wherein the calibrated torque setting is the expected performance setting; and automatically updating the present torque setting to match the calibrated torque setting when the present torque setting is not equal to the calibrated torque setting.

13. The method of claim 11, wherein executing a control action further includes: activating an audio/visual alarm device external to the work cell when said present position of said threaded fastener is not equal to the corresponding fastener position, wherein the audio/visual alarm device includes at least one of a lamp and a speaker.

14. The method of claim 11, wherein displaying an expected position from the calibrated sequence includes displaying a template of the work piece via the GUI, and overlaying the template with an icon of the expected position.

* * * * *